(12) United States Patent
Madden

(10) Patent No.: US 7,637,520 B2
(45) Date of Patent: Dec. 29, 2009

(54) MOTORCYCLE LOWER FORK TUBE COVER

(75) Inventor: Kenneth E. Madden, Somerset, WI (US)

(73) Assignee: Kuryakyn Holdings, Inc., Somerset, WI (US)

( * ) Notice: Subject to any disclaimer, the term of this patent is extended or adjusted under 35 U.S.C. 154(b) by 225 days.

(21) Appl. No.: 12/009,758

(22) Filed: Jan. 22, 2008

(65) Prior Publication Data

US 2008/0185811 A1  Aug. 7, 2008

(51) Int. Cl.
*B62K 19/40* (2006.01)
*B62K 21/02* (2006.01)

(52) U.S. Cl. ............... 280/276; 280/279; 280/277; 280/304.3; 280/152.1; 180/219; D12/110; D12/118; D12/126; 188/322.12; 188/322.22

(58) Field of Classification Search ............. 280/304.3, 280/279, 277, 276, 152.1; 180/219; D12/110, D12/118, 126; 188/322.12, 322.22
See application file for complete search history.

(56) References Cited

U.S. PATENT DOCUMENTS

| | | | |
|---|---|---|---|
| 4,138,132 A * | 2/1979 | Doyle | 280/304.3 |
| D295,396 S | 4/1988 | Rudd et al. | |
| D313,774 S | 1/1991 | Hauer | |
| D341,343 S | 11/1993 | Netz | |
| D491,112 S | 6/2004 | Francis et al. | |
| 6,837,508 B2 * | 1/2005 | Francis et al. | 280/276 |
| 6,837,509 B2 * | 1/2005 | Welch et al. | 280/304.3 |
| 7,185,905 B2 * | 3/2007 | Czysz | 280/276 |
| 2002/0189878 A1 * | 12/2002 | Iimuro | 180/219 |
| 2008/0023934 A1 * | 1/2008 | van Houweling | 280/276 |
| 2009/0051140 A1 * | 2/2009 | Saguchi | 280/304.3 |

OTHER PUBLICATIONS

Kuryakyn Holdings, Inc. Catalog, 2002, 2 pages.
Kuryakyn Holdings, Inc. Catalog, 2006, 2 pages.

* cited by examiner

*Primary Examiner*—Lesley Morris
*Assistant Examiner*—Marlon A Arce
(74) *Attorney, Agent, or Firm*—Dicke, Billig & Czaja, PLLC

(57) ABSTRACT

A lower fork tube cover is comprised of a first cover member and a second cover member that is connectable to the first cover member. A mounting bracket attaches to an inner surface of the first cover member to mount the first cover member to a front brake caliper mount connected to the lower fork tube. An upper portion of the first cover member is configured to cover a first portion of the lower fork tube and the front brake caliper mount. A lower portion of the first cover member substantially surrounds a rear half of a second portion of the lower fork tube. A base wall extends from the lower portion. The second cover member is configured to substantially surround a front half of the lower fork tube. The second cover member includes a base wall at a lower end that overlaps with and is connectable to the base wall of the first cover member to cover a lower end of the lower fork tube. A front edge of the second cover member overlaps and is connectable to a front edge portion of the first cover member. Mating inner edges of the first and second cover members are configured to provide clearance for an axle of a wheel carried on the lower fork tube.

1 Claim, 4 Drawing Sheets

MOTORCYCLE LOWER FORK TUBE COVER

BACKGROUND

The present invention generally relates to custom accessories for a motor vehicle, such as a motorcycle. In particular, the present invention relates to a cover accessory for a motorcycle lower fork tube.

Consumers have shown a strong interest in customizing their motorcycles by adding accessories to enhance the appearance of the motorcycle. A front fork assembly of a motorcycle carries the front wheel and typically comprises upper and lower fork tubes that are telescopically connected together. The lower fork tubes of most new motorcycles are made from a low luster metal, such as aluminum, due to the expense of chrome plating. A lower fork tube cover that could be installed without removal of the front wheel and could substantially surround a portion of the lower fork tube, thereby simulating a chrome plated lower fork tube would, be an improvement over existing lower fork tube covers.

SUMMARY OF THE INVENTION

The present invention is a cover assembly for a lower fork tube of a motorcycle front fork assembly in which the lower fork tube has a wheel axle mount and a front brake caliper mount. The cover assembly generally comprises first and second cover members. The first cover member comprises a nonplanar wall having an upper end, a lower end, a front edge, a rear edge, an upper portion and a lower portion. The wall of the first cover member extends from the front edge in a first direction for a first distance, and then extends in a second direction to the rear edge, the second direction being at an angle relative to the first direction. The lower portion extends from the front edge to the rear edge in an arc of about 180 degrees. The rear edge of the lower portion comprises an arcuate wall cut out. The lower end comprises a base wall extending generally perpendicular to the lower wall portion. A mounting bracket has a first portion configured for connection to an inner surface of the first cover member, and a second portion configured for connection to the front brake caliper mount. The second cover member comprises a generally hemicylindrical wall having an upper end, a lower end, a front edge and a rear edge. The rear edge of the wall adjacent to the lower end comprises an arcuate wall cut out. The lower end of the second cover member comprises a base wall that extends generally perpendicular to the wall of the second cover member. The front edge of the second cover member registers with a wall portion of the first cover member adjacent to the front edge of the first cover member. The base wall of the first cover member registers with the base wall of the second cover member. The first and second cover members are connectable adjacent the respective front edges and the respective base walls.

DETAILED DESCRIPTION

Figure 1:
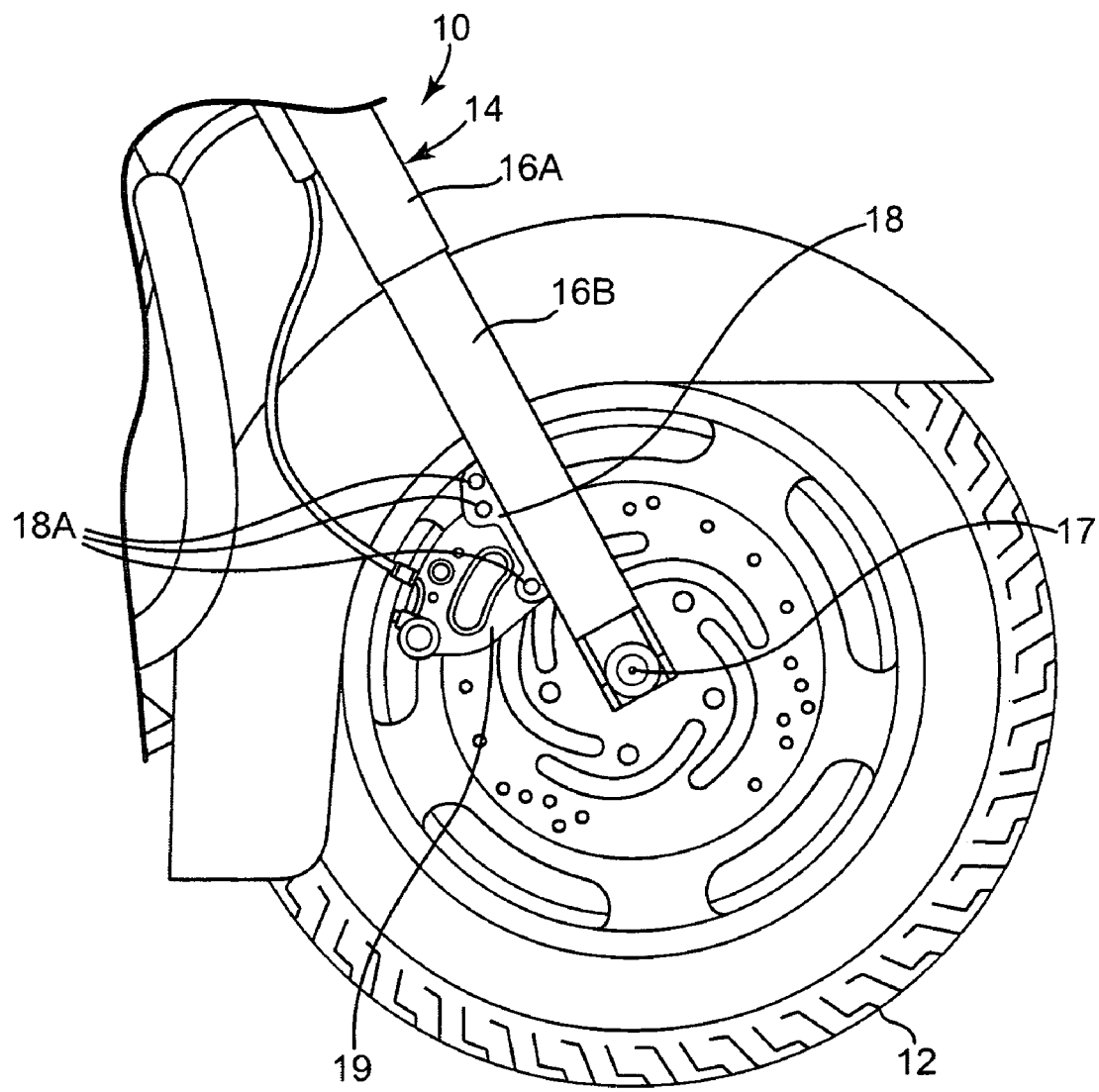
FIG. 1 is a partial side view of a front end of a motorcycle.

FIG. 1 is a partial side view of a front end of a motorcycle 10 comprising a front wheel 12 rotationally mounted on a fork tube assembly 14 consisting of left and right spaced fork tubes 16. Each fork tube 16 includes an upper tube 16A, which is connected to a triple tree that is pivotally mounted to the motorcycle frame (not shown), and a lower tube 16B telescopically extending from the upper tube 16A. The free end of the lower tube includes a front axle mount 17 for mounting the wheel axle to each fork tube 16 of the fork tube assembly 14. The lower fork tube 16B includes a mounting bracket 18 on a rear side of the outer surface of the lower fork tube 16B with mounting holes 18A for mounting a front brake caliper. The lower fork tube is often made from a low luster metal, such as aluminum, due to the expense associated with chrome plating the entire lower tube. The present invention is a lower fork tube cover assembly that substantially surrounds a portion of the lower tube 16B and can be installed without removal of the front wheel from the fork tube assembly 14.

Figure 2:
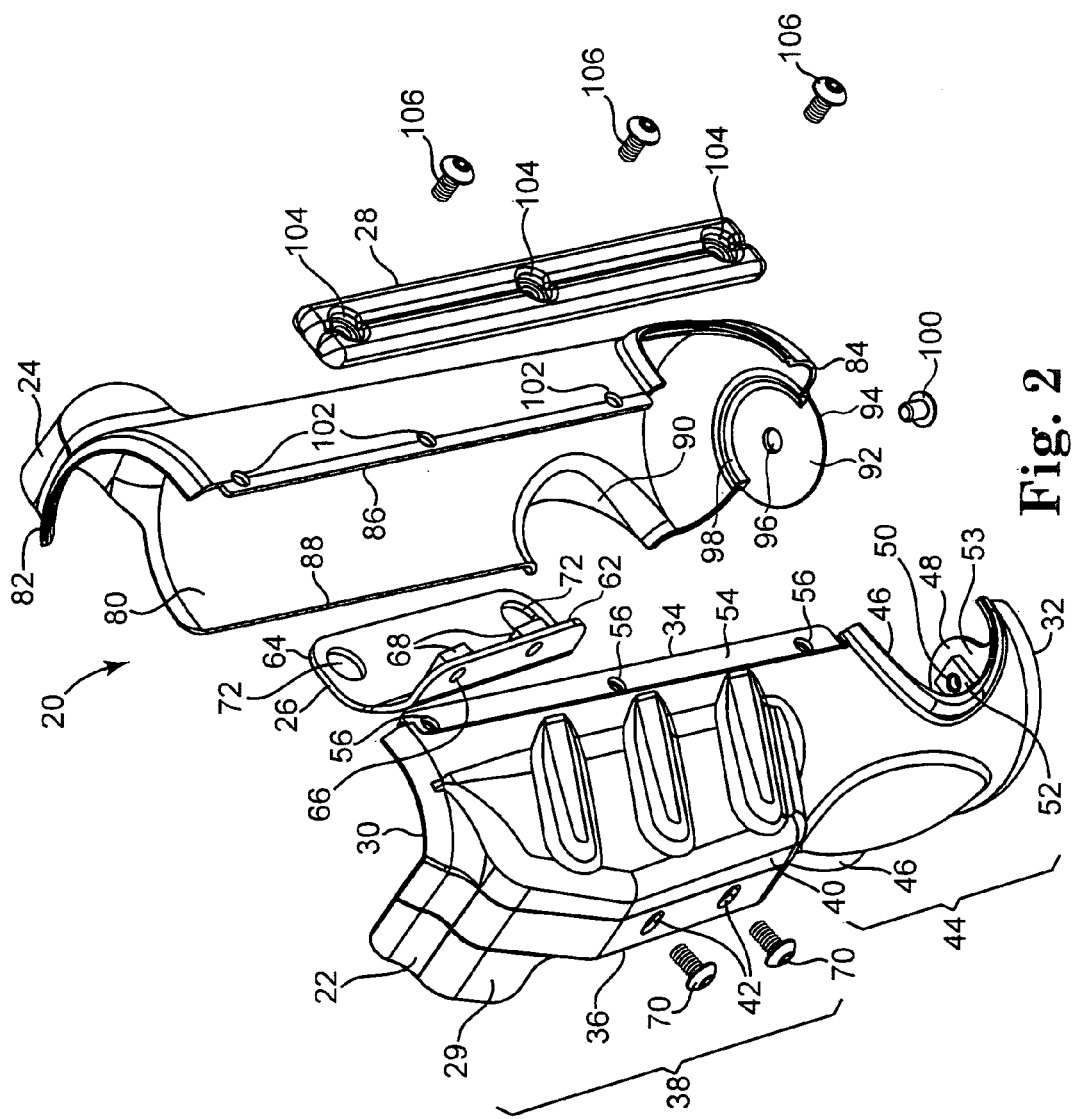
FIG. 2 is an exploded perspective view of the motorcycle lower fork tube cover assembly of the present invention.

FIG. 2 is an exploded perspective view of a lower fork tube cover assembly 20 for substantially surrounding a lower tube of a motorcycle fork tube assembly. The lower fork tube cover assembly 20 generally comprises a first cover member 22, a second cover member 24, a mounting bracket 26 and a seam cover 28. The first cover member 22 comprises a nonplanar shell wall 29 made from a sturdy, thin-walled material, such as stamped steel, die cast aluminum or a suitable polymer. Suitable polymers include acrylonitrile butadiene styrene (ABS), polyester, polycarbonate, fiber reinforced plastics, and the like. The outer surface of wall 29 may be chrome plated.

First cover member 22 has an upper end 30, a lower end 32, a front edge 34, and a rear edge 36. An upper cover portion 38 of the shell wall 29 extends in a first direction from front edge 34 to a blunt corner 40, and in a second direction, generally at a right angle to the first direction, from the blunt corner 40 to rear edge 36. Adjacent to rear edge 36, the upper portion 38 of shell wall 29 is configured with a pair of through holes 42 for connecting first cover member 22 to mounting bracket 26. Upper portion 38 is dimensioned to cover a portion of a lower fork tube and its front brake caliper mounting bracket.

Figure 3:
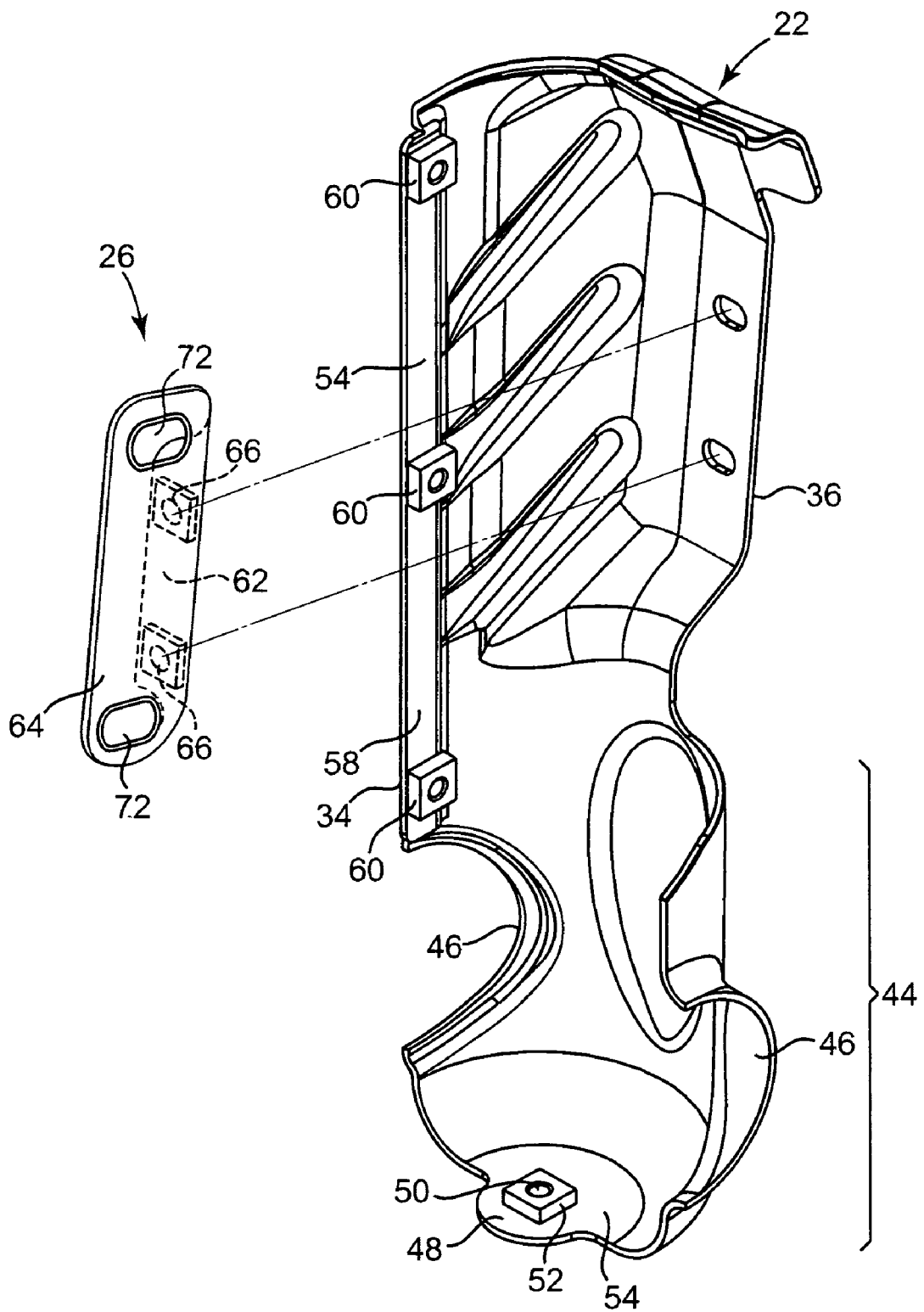
FIG. 3 is a rear perspective view of a first cover member and mounting bracket of the lower fork tube cover assembly of FIG. 2.

Cover member 22 further includes a lower cover portion 44 which extends from front edge 34 to rear edge 36 in a generally hemicylindrical arc of about 180 degrees, sufficient to substantially surround a rear half of the lower fork tube. In one embodiment, adjacent to lower end 32, the front and rear edges 34, 36 are each configured with a semi-circular wall portion "cut-out" 46 that corresponds to the location of the front wheel axle. As shown in FIGS. 2 and 3, extending from lower cover portion 44 at lower end 32 is a semicircular base wall 48 which is configured with a through hole 50. A threaded nut 52 is secured to the inner surface 53 of base wall 48 coaxial with hole 50. Adjacent to the front edge 34, between cut out 46 and upper end 30, wall 29 is configured with a linear recessed wall portion 54. Wall portion 54 includes a plurality of spaced holes 56 therethrough. As shown in FIG. 3, secured to the rear surface 58 of wall portion 54 are a plurality of threaded nuts 60 which are coaxial to holes 56. Threaded nuts 60 and 52 provide means for connection cover member 22 to cover member 24.

As further shown in FIGS. 2 and 3, mounting bracket 26 comprises an L-shaped metal body having a first leg 62 and a second leg 64. Leg 62 is configured with a pair of spaced holes 66 therethrough. Threaded bolts 68 are connected to an inner surface of leg 62 coaxial to holes 66. Holes 66 align with holes 42 in the upper portion 38 of wall 29. Leg 62 is secured to cover member 22 by threaded bolts 70 which thread into nuts 68. Second leg 64 is configured with a pair of oblong through holes 72 which are spaced to align with mounting holes on the caliper mounting bracket on the lower fork tube so as to allow first cover member 22 to be mounted relative to the lower fork tube.

Second cover member 24 comprises a hemicylindrical shell wall 80 formed similar to first cover member 22. Second cover member 24 has an upper end 82, a lower end 84, a front edge 86 and a rear edge 88. Wall 80 generally defines an arc from front edge 86 to rear edge 88 of about 180 degrees, sufficient to substantially surround a front half of the lower fork tube. In one embodiment, like first cover member 22, edges 86 and 88 of wall 80 are configured with semi-circular "cut outs" 90 near lower end 84, corresponding to the location of the front wheel axle. Wall 88 radially tapers at lower end 84 and transitions to a base wall 92 that is generally perpendicular to wall 80. Base wall 92 is a generally circular wall with an edge portion 94 that extends beyond edges 86 and 88. Base wall 92 includes a through hole 96. A radial shoulder 98 spaced from hole 96 is configured to mate with base wall 48 of first cover member 22. When cover members 22 and 24 are assembled together, hole 96 aligns with hole 50 and threaded nut 52. A threaded bolt 100 passes through hole 96 and threads into nut 52 to secure bases 48 and 92 together.

Second cover member 24 further includes a plurality of holes 102 through wall 80 adjacent to edge 86. Holes 102 align with holes 56 in wall portion 54 of first cover member 22 when cover members 22 and 24 are assembled together. Seam cover 28 is a decorative metal strip having a length and a width sufficient to overlap and cover the seam defined along edge 86 adjacent to holes 102. Seam cover 28 includes a plurality of recessed holes 104 that align with holes 102 and 56. Threaded bolts 106 pass through holes 104, 102 and 56 and thread into nuts 60 to secure cover members 22 and 24 together along edges 54, 86, as shown in FIG. 4.

Cover assembly 20 is installed by first connecting leg 62 of mounting bracket 26 to cover member 22, and then securing leg 64 of mounting bracket 26 to the upper holes 18A of the brake caliper mounting bracket 18 on the lower fork tube 16B. The oblong holes 72 in leg 64 allow adjustment in the position of cover member 22 relative to lower fork tube 16B. Once cover member 22 is securely mounted, cover member 24 is positioned over a front half of lower fork tube 16B and edge 86 is positioned over the recessed wall portion 54 of cover member 22. Holes 102 are aligned with holes 56 of cover member 22, and the seam cover 28 is then positioned with holes 104 aligned with holes 102 and secured with the threaded bolts 106. Holes 50 and 96 of base walls 48 and 92, respectively, are also aligned and secured with bolt 100.

Figure 4:
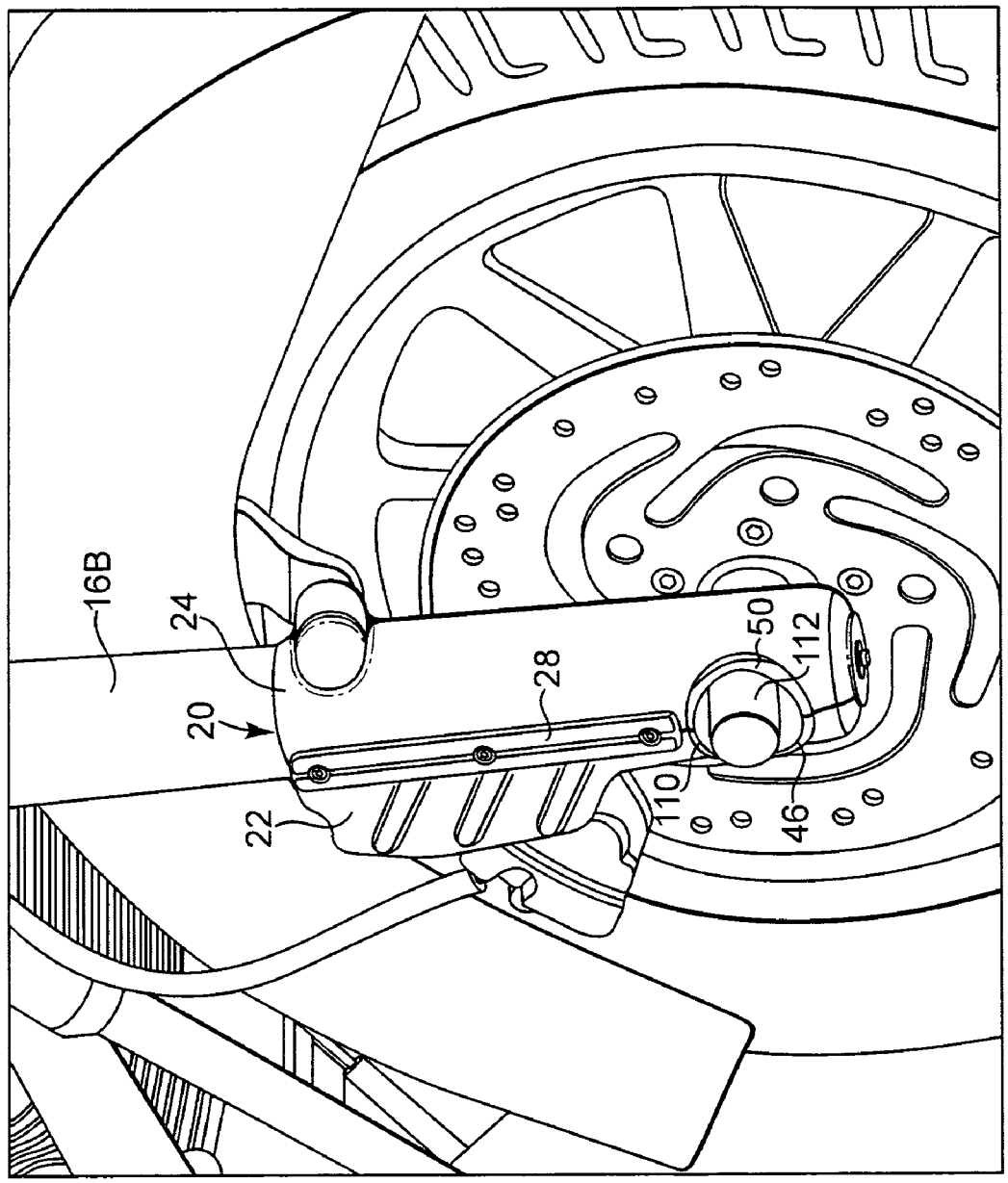
FIG. 4 is a perspective view of a wheel mounted to a motorcycle right front fork tube that is covered with the assembled cover assembly of FIG. 2.

As shown in FIG. 4, once assembled, cover member 22 covers the caliper mounting bracket and substantially surrounds the lower rear portion of the lower fork tube 16B. Cover member 24 substantially surrounds a front half of lower fork tube 16B which gives the visual effect of cover assembly 20 being an original integral part of the lower fork tube 16B. Cut outs 46 and 90 define a circular opening 110 on opposite sides of cover assembly 20 for the axle of the front wheel. Opening 110 adjacent to seam cover 28 is sized to allow a conventional axle nut cover 112 to be connected to the wheel axle in a manner known in the art. In an alternative embodiment, cut outs 46 and 90 forming the opening 110 adjacent to seam cover 28 are eliminated such that walls 29 and 80 completely cover the wheel axle. Cover assembly 20 allows easy and quick means of accessorizing of a lower front fork tube without having to remove the front wheel and without the cost and effort of replacing the entire lower front fork tube with a fully chromed fork tube.

Although specific embodiments have been illustrated and described herein, it will be appreciated by those of ordinary skill in the art that a variety of alternate and/or equivalent implementations may be substituted for the specific embodiments shown and described without departing from the scope of the present invention. Therefore, it is intended that this invention be limited only by the claims and the equivalents thereof.

What is claimed is:

1. A cover assembly for a lower fork tube of a motorcycle front fork assembly, the lower fork tube having a wheel axle mount and a front brake caliper mount, the cover assembly comprising:

a first cover member comprising a nonplanar wall having an upper end, a lower end, a front edge, a rear edge, an upper portion and a lower portion, the wall extending from the front edge in a first direction for a first distance, and then extending in a second direction to the rear edge, the second direction being at an angle relative to the first direction, the lower portion extending from the front edge to the rear edge in an arc of about 180 degrees, the front and rear edges of the lower portion comprising arcuate wall cutouts, the lower end comprising a base wall extending generally perpendicular to the lower wall portion;

a mounting bracket having a first portion configured for connection to an inner surface of the first cover member, and a second portion configured for connection to the front brake caliper mount;

a second cover member comprising a generally hemicylindrical wall having an upper end, a lower end, a front edge, a rear edge, the front and rear edges of the wall adjacent to the lower end comprising arcuate wall cutouts, the lower end comprising a base wall extending generally perpendicular to the wall of the second cover member, the front edge of the second cover member registerable with a wall portion of the first cover member adjacent to the front edge of the first cover member, and the base wall of the first cover member being registerable with the base wall of the second cover member;

wherein the first and second cover members are connectable adjacent the respective front edges and the respective base walls.

* * * * *